United States Patent [19]

McNaney

[11] 4,090,779
[45] May 23, 1978

[54] LIGHT BEAM POSITION CONTROL SYSTEM

[76] Inventor: Joseph T. McNaney, 8548 Boulder Dr., La Mesa, Calif. 92041

[21] Appl. No.: 758,301

[22] Filed: Jan. 10, 1977

[51] Int. Cl.² ............................................... G02F 1/16
[52] U.S. Cl. .................................................. 350/355
[58] Field of Search ............... 350/160 R, 161 W, 285

[56] References Cited

U.S. PATENT DOCUMENTS 4,004,847  1/1977  McNaney ..................... 350/161 W Primary Examiner—William L. Sikes

[57] ABSTRACT

The system herein includes a unique array of light beam reflecting surfaces and reflection control means for effecting changes in the position of a light beam along the scan-line output surface of the system with a much higher degree of sensitivity than is possible with more well known line scan light beam deflection systems. This is accomplished primarily by allowing the reflection control means within the array of reflecting surfaces to be utilized repeatedly in effecting a given change in the position of a light beam at any given time.

4 Claims, 8 Drawing Figures

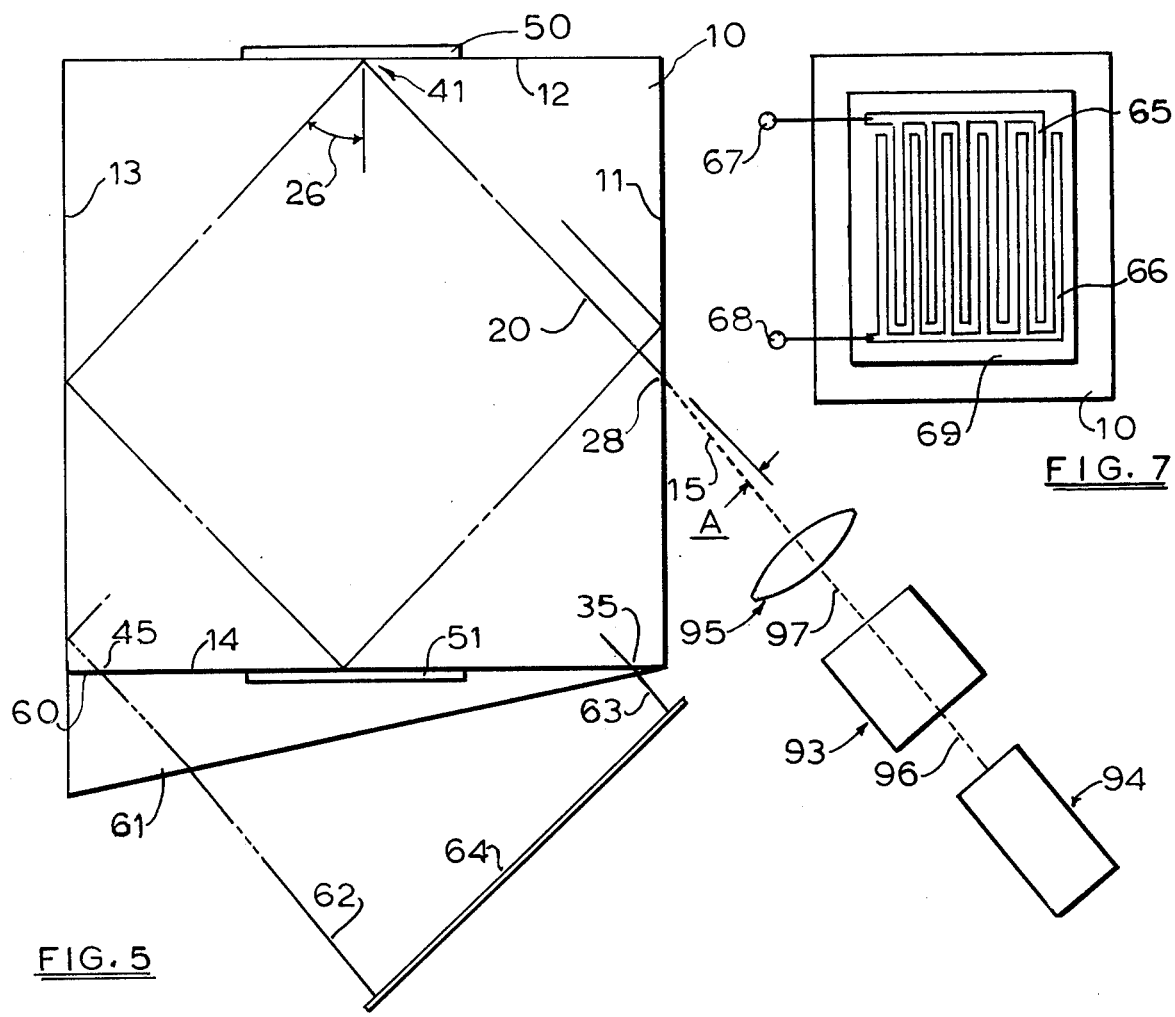
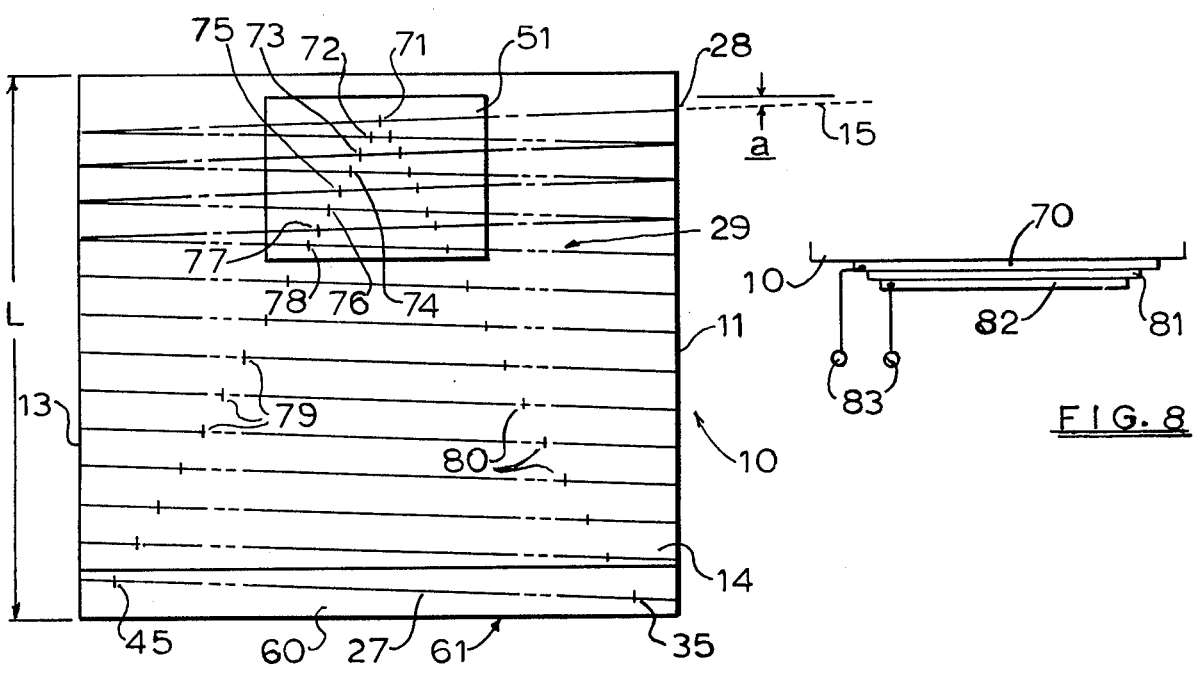

LIGHT BEAM POSITION CONTROL SYSTEM

BACKGROUND OF THE INVENTION

The invention herein relates to certain teachings disclosed in the applicant's U.S. Pat. application Ser. No. 729,310 filed Oct. 4, 1976, wherein is set forth means for greatly increasing light reflection control sensitivity of a light optic data handling system. These and additional means are incorporated in the present invention so as to increase still further the light reflection control sensitivity within such systems and more particularly in applications thereof requiring a line-at-a-time scanning of viewing surfaces with a beam of radiant energy focused thereon.

SUMMARY OF THE INVENTION

A beam of light, which can be in the form of radiant energy extending from ultraviolet, through the visible spectrum, to infrared and preferably from a laser source, is directed along an input path toward a light admitting surface of an array of light reflecting surfaces of the system. Upon entering the system light is directed along a first portion of a primary optical path for a controlled redirecting thereof along a second portion of the primary path. The means for directing the light along the first and second primary portions include an array of light reflecting surfaces each angularly oriented so as to establish an optical relationship one with respect to the other and to the admitting surface for allowing the light to follow these paths forming a helix of plural revolutions. Light reflection control positions are distributed along the first primary portion and light reflection control means are associated operatively therewith for effecting a redirecting of light along a second primary portion which will be one of a plurality of such second primary portions stemming from the first primary portion. Each of the second portions extend to an output surface of the system and thereupon along corresponding secondary optical paths stemming from the output surface. The path length of the second primary portion is designed to provide a magnification of the redirecting capabilities of the control means in combination with the use of a number of control means positioned along the first portion which contribute to still further magnifications of the redirecting capabilities of the overall system. Different embodiments illustrated herein show, by way of example only, the means of meeting these objectives of the invention. The description which follows, when read in connection with the drawing hereof, will provide a better understanding of these objectives as well as other advantages included in the invention.

BRIEF DESCRIPTION OF THE DRAWINGS

FIGS. 5 and 6 represent first and second views of another system embodiment of the invention;

FIG. 7 represents an example of at least one electrode assembly means which can become part of the reflection control means; and FIG. 8 is a detail relating to still another part of a light reflection control means.

DESCRIPTION OF THE INVENTION

Figure 1:
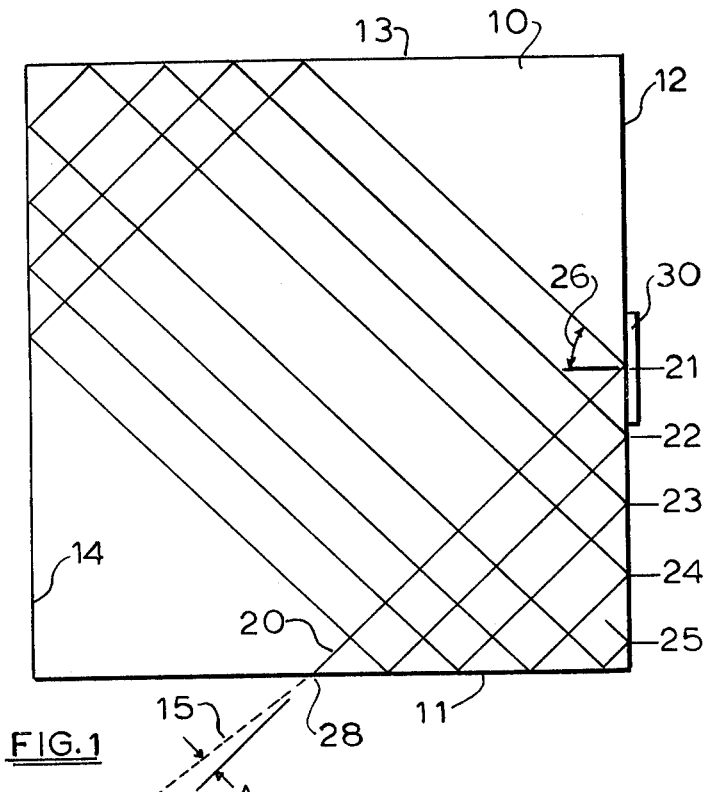
FIGS. 1, 2, 3 and 4 represent several views of a first system embodiment of the invention.
Figure 2:
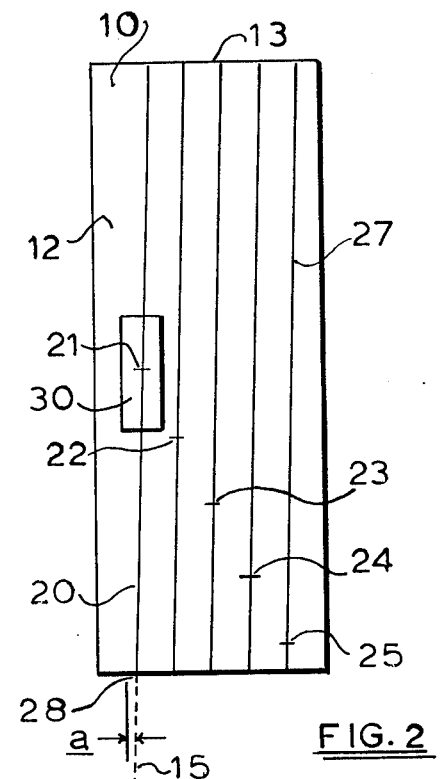
Figure 3:
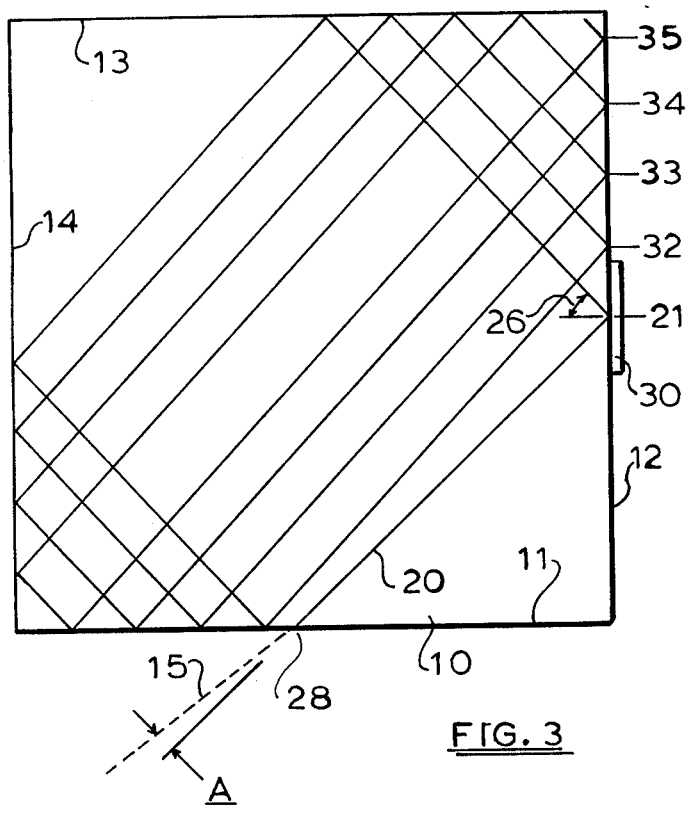

Referring now to the drawings first and second views of a first embodiment of the invention are shown, respectively in FIGS. 1 and 2. Similar views are again shown in FIGS. 3 and 4. In FIG. 1 the end view of a member 10 is exemplified as having four light reflecting surfaces 11, 12, 13 and 14 and each of which can be understood as being a light reflecting interface of the member 10 material and an air environment surrounding it. Member 10 can be any of a number of different compositions of light conducting materials. It will be described later that under certain circumstances member 10 may be of a glass or plastic material and therefore a passive optical element, while under different circumstances member 10 may be of a material selected from those, either in the form of a gas, liquid, colloid or solid, exhibiting either piezoelectric, Pockels, Kerr or ferroelectric effects, and such materials may include lithium niobate, barium titanate, quartz, etc., to name a few. Although shown as having four light reflecting surfaces, member 10 and the invention is not to be limited in this regard. It, of course, may be limited to but three such surfaces or have five or more, and be within the scope of the invention since particular design requirements will determine the number of reflecting surfaces needed.

Figure 4:
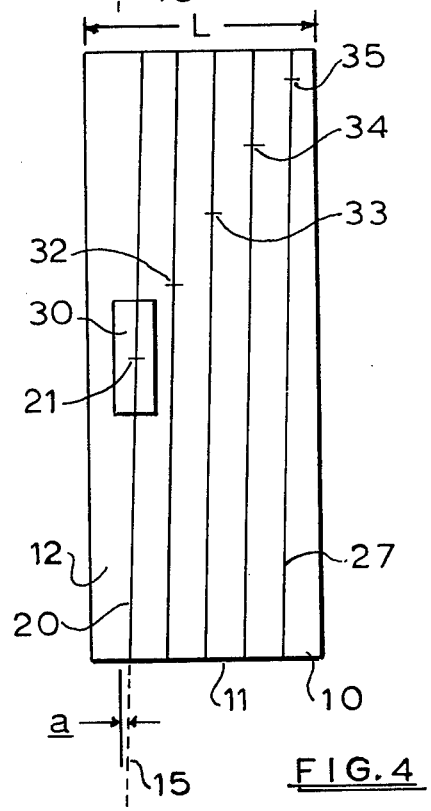

Light, preferably from a laser source, will be described as being directed along a refraction-compensated input path 15, at an angle A as indicate in FIG. 1, and at an angle $a$ as indicated in FIG. 2. The angle of entry $a$ will permit a beam of light to follow a path 20 so as to spiral its way through the length L of the member 10, and in combination with the angle A form a particular spiral shown in FIG. 1. Insofar as the surface 12 is concerned, the beam will appear at a series of total internal reflection points, or positions, 21, 22, 23, 24 and 25, as indicated. In establishing this particular path of positions, diagonally in the direction of length L, the angle of path 20 incident on surface 12 at position 21 will be, for the purpose of discussion, 43°, as opposed to an otherwise normal angle of 45°, since the member 10 is essentially a cube. In the process of increasing an angle of reflection 26 from an established 43° to the normal of 45°, each of the positions 22, 23, 24 and 25 will have been shifted from the initial diagonal path to and along a path paralleling the surfaces 11 and 13 in the direction of the length L from the position 21. Light reflection control means 30, designed to effect this process, are positioned on the surface 12 adjacent the position 21. The continuing of this process and thereby increasing the angle of reflection 26 from the normal of 45° to 47°, for example, the path of reflection points will have been shifted again diagonally in the direction of length L and established along a line of positions 32, 33, 34 and 35 extending from position 21, as shown in FIG. 4, and indicated as well in FIG. 3. The position 25 in FIG. 2 and the position 35 in FIG. 4 represent the two extremes of a series of positions at which a beam of light entering member 10 can be made to appear along a final path 27 of the spiralling second portion of the primary path 20. The number of different positions established will be in accordance with the number of different control signals to which the control means will be designed to respond.

The foregoing exemplification of the manner in which the invention is designed to function is to show primarily the presence of a particular ratio represented by the relationship between the total input angular change of 4° adjacent the position 21 and the length of a resulting scan-line extending from position 25 to position 35 along the final path 27. This ratio can, of course, be increased by an increase in the primary path extending from the position 21 to the position 35 by a corresponding increase in the length L of the member 10. Another object of the invention is to extend this ratio still further by increasing the number of positions along the path 20, in addition to the position 21, at which the beam can be influenced two or more times by the same control means 30.

Referring now to FIGS. 5 and 6, end and side views, respectively, are again shown of a member 10. To simplify the illustration a complete helical path 20 between the input point 28 and a terminal point 35 has been omitted from the drawing, however, the complete path is shown in FIG. 6. It will be described as being the primary optical path of the system consisting of a first primary portion extending from the input point 28 to about a point 29 along the path, and a second primary portion extending from the point 29 to the terminal point of the path, which is point 35. The overall length of the first and second portions has been drawn to exemplify a path being three times the length of the path 20 in the illustrations of the FIGS. 1-4 embodiment. This will assist in showing a need for smaller input angular change requirements in relation to the length of an output scan-line. For example, the initial angle of a beam incident on the surface 12 at a point 41 can be understood to be 44.4°, or 0.6° less than an otherwise normal of 45°. An angle of reflection 26 will therefore be 44.4°, establishing a series of reflection points, from a point 71 to a point 45, diagonally in the direction of length L. Point 45 establishes a reference point from which beam positioning begins along the line 27.

In this embodiment of the invention a reflection control means 50 is positioned on the surface 12 adjacent a series of reflection points 71, 73, 75 and 77, and a reflection control means 51 is positioned on the surface 14 adjacent a series of reflection points 72, 74, 76 and 78. The control means 50 influences a redirecting of light simultaneously at each of four different positions and the control means 51 influences a redirecting of light simultaneously at each of four different positions. In view of the conditions set forth a change in an angle of reflection 26 of 1.2° will provide a complete scan of the line from the point 45 to the point 35. In providing the 1.2° angular change the extent of the required angular change at each of the positions 71 through 78 will be 0.15°. This, of course, does not represent any limit in this regard since the concept lends itself to still other modifications leading to further improvements in beam deflection sensitivities. Such modifications may include the use of control means at a greater number of control positions along the primary path, or a further lengthening of the overall path. In any event, a beam of light entering the member 10 along the input path 15 will be directed along the first primary portion, between points 28 and 29, so as to establish an availability of light coincident with one or more locations along the first portion, such as locations 71 through 78, from which a redirecting of the beam will take place. In doing so, the beam may be directed along any one of a plurality of second primary portions toward an output surface 60. The terminal end of each such portion of the primary path may therefore coincide with any one of a number of positions along the output surface between the extreme points 45 to 35. Locations 71 to 78, therefore, are a series of light reflection points followed by an extension of similar points 79 along the second primary portion and are shifted to the right of their initial position in accordance with the particular output position on the surface 60 to which a beam is directed, until the entire series has been established along points 80, corresponding to an end of line scan.

A passive optical element 61 of light conducting material, being prismatic in shape for example, is supported adjacent the surface 60 and having an index of refraction greater than that of member 10 material whereby light incident on the surface 60 will be permitted passage along secondary paths which extend from path 62 to path 63 until reaching, for example, the surface of a record medium 64. The light source for the system may include a laser 94. Light along a path 96, through a modulator 93, and along a path 97, is admitted to a lens system 95 and focused thereby in the plane of medium 64.

Light reflection control means 50 and 51, as well as means 30, may be comprised of one of several different means of effecting a redirecting of light at their respective control positions. It may take the form of an interdigital electrode assembly shown in FIG. 7. Electrical signals will be applied to opposing electrode fingers 65 and 66 thereof through terminal means 67 and 68 so as to establish spatial modulation of the refractive index of materials forming a light reflecting interface at the control positions, acting as a diffraction grating for redirecting light incident thereon. A layer 69 of light conducting material, presenting an index of refraction which is lower than that of the member 10 material is sandwiched between the electrode fingers and the member 10. This layer 69 may be a thin film of glass deposited on material 10 which may be a crystal quartz, lithium niobate, or still other piezoelectric effect materials. Or, the member 10 material can be of glass and the layer 69 a piezoelectric effect or electro-optic material. The means for establishing periodic variations of index of refraction at the reflecting interface can also take the form of an acousto-optic means such as that described in applicant's U.S. Pat. No. 3,985,426.

The light beam reflection control means may also take the form of an electro-optic device such as that illustrated in the FIG. 8 detail. This may consist of a layer 81 of Kerr or Pockels effect material, having a thin film light transparent electrically conductive electrode means 70 sandwiched between the layer 81 and member 10 material, and second electrode means 82 joined to the outer surface of the layer 81. The materials 70 and 81 may each have indices of refraction lower than that of member 10 material. The applying of an electrical potential to input terminals 83 will provide a modifying of the index differential of materials at the reflecting interface thereof and the required redirecting of light therefrom.

It should be understood by those skilled in the arts that the invention as set forth herein is illustrative and therefore includes other modifications and equivalents as may be seen by those skilled in the arts pertaining hereto but still being within the scope of the appended claims.

I claim:
1. In a light beam position control system:
 (a) a source of light;
 (b) an array of light reflecting surfaces, each surface presenting a length dimension, a width dimension, and first and second ends;
 (c) means for directing light from said source along an input path toward said array of surfaces at said first end thereof and thereupon along an optical path within said array of surfaces extending to a light output surface thereof, said output surface extended along said width dimension of said array at said second end thereof, said light input path optically related through said array of surfaces to a light output path stemming from said output surface, each surface of said array of surfaces angularly oriented one with respect to the other for allowing light admitted to said array from said source to be reflected thereby along said optical path forming a helix of plural revolutions, said helix of plural revolutions extended in the direction of said length dimension from said first end to said output surface at said second end of said array of surfaces;

(d) means for directing light from said source along an optical path within said array of surfaces so as to allow said light to be reflected along said helix of plural revolutions toward said light output surface and allow said light to be incident upon a predetermined position along said dimension thereof across said second end of the array of surfaces.

2. The invention as set forth in claim 1, including light reflection control means for redirecting said light from along said optical path to and along a second optical path within said array of surfaces so as to allow said light to be reflected along said helix of plural revolutions toward said light output surface and allow said light to be incident upon a second predetermined position along said dimension thereof across the second end of said array of surfaces.

3. The invention as set forth in claim 2, wherein said light reflection control means is positioned in the path of light from said source along said input path toward said array of surfaces for effecting said redirecting of light to and along said second optical path for thereby allowing said light to be incident upon said second predetermined position along said dimension thereof across the second end of said array of surfaces.

4. The invention as set forth in claim 2, wherein said light reflection control means is operatively associated with said array of surfaces along said optical path therein for effecting said redirecting of light to and along said second optical path for thereby allowing said light to be incident upon said second predetermined position along said dimension thereof across the second end of said array of surfaces.

* * * * *